US011687190B2

(12) United States Patent
Chadirac

(10) Patent No.: US 11,687,190 B2
(45) Date of Patent: Jun. 27, 2023

(54) MULTITOUCH TOUCH DEVICE EMPLOYING CAPACITIVE DETECTION

(71) Applicant: SAFRAN ELECTRONICS & DEFENSE COCKPIT SOLUTIONS, Montreuil (FR)

(72) Inventor: Laurent Chadirac, Moissy-Cramayel (FR)

(73) Assignee: SAFRAN ELECTRONICS & DEFENSE COCKPIT SOLUTIONS, Montreuil (FR)

( * ) Notice: Subject to any disclaimer, the term of this patent is extended or adjusted under 35 U.S.C. 154(b) by 0 days.

(21) Appl. No.: 17/276,868

(22) PCT Filed: Sep. 17, 2019

(86) PCT No.: PCT/EP2019/074837
§ 371 (c)(1),
(2) Date: Mar. 17, 2021

(87) PCT Pub. No.: WO2020/058254
PCT Pub. Date: Mar. 26, 2020

(65) Prior Publication Data
US 2021/0373735 A1 Dec. 2, 2021

(30) Foreign Application Priority Data

Sep. 17, 2018 (FR) ...................................... 1858360

(51) Int. Cl.
*G06F 3/041* (2006.01)
*G06F 3/044* (2006.01)

(52) U.S. Cl.
CPC .......... *G06F 3/04166* (2019.05); *G06F 3/044* (2013.01); *G06F 3/04186* (2019.05); *G06F 2203/04104* (2013.01)

(58) Field of Classification Search
CPC .. G06F 3/04166; G06F 3/04186; G06F 3/044; G06F 2203/04104; G06F 3/0446
See application file for complete search history.

(56) References Cited

U.S. PATENT DOCUMENTS 8,648,837 B1 * 2/2014 Tran ...................... G06F 3/0442
345/157
8,816,985 B1 * 8/2014 Tate .................. G06F 3/041661
345/173

(Continued)

OTHER PUBLICATIONS

Written Opinion of the International Searching Authority dated Nov. 4, 2019, issued in corresponding International Application No. PCT/EP2019/074837, filed Sep. 17, 2019, 6 pages.

(Continued)

*Primary Examiner* — Amy Onyekaba
(74) *Attorney, Agent, or Firm* — Christensen O'Connor Johnson Kindness PLLC

(57) ABSTRACT

A multitouch touch device (DIS) employing capacitive detection, including: a touch matrix array and a first voltage-generating source configured to generate, for each row and each column of the matrix array, a first input voltage having a first frequency leading to the generation of a first output voltage. The device also includes a second voltage-generating source for generating, for each intersection between at least two rows and two columns of the matrix array, a second input voltage having a second frequency different from the first frequency leading to the generation of a second output voltage. A processing circuit is configured to determine, depending on first and second reference values, whether the first and second output voltages are representative of a press and of its position.

17 Claims, 2 Drawing Sheets

(56) References Cited

U.S. PATENT DOCUMENTS

| | | | | |
|---|---|---|---|---|
| 9,625,507 B2* | 4/2017 | Erdogan | | G06F 3/0446 |
| 9,665,223 B2* | 5/2017 | Sontag | | G06F 3/002 |
| 10,656,741 B2* | 5/2020 | Park | | G06F 3/03545 |
| 2008/0158180 A1* | 7/2008 | Krah | | G06F 3/048 |
| | | | | 345/173 |
| 2010/0066692 A1* | 3/2010 | Noguchi | | G06F 3/044 |
| | | | | 345/173 |
| 2010/0177059 A1* | 7/2010 | Wang | | G06F 3/0446 |
| | | | | 345/174 |
| 2010/0245286 A1* | 9/2010 | Parker | | G06F 3/04883 |
| | | | | 345/174 |
| 2011/0115717 A1* | 5/2011 | Hable | | G06F 3/04184 |
| | | | | 345/173 |
| 2011/0175835 A1* | 7/2011 | Wang | | G06F 3/0446 |
| | | | | 345/173 |
| 2011/0261007 A1* | 10/2011 | Joharapurkar | | G06F 3/0418 |
| | | | | 345/174 |
| 2012/0038584 A1* | 2/2012 | Liu | | G06F 3/04166 |
| | | | | 345/174 |
| 2012/0044192 A1* | 2/2012 | Hsu | | G06F 3/0446 |
| | | | | 345/173 |
| 2012/0146944 A1* | 6/2012 | Lee | | G06F 3/0446 |
| | | | | 345/174 |
| 2012/0194470 A1* | 8/2012 | Yu | | G06F 3/04166 |
| | | | | 345/174 |
| 2012/0319993 A1* | 12/2012 | Coni | | G06F 3/0446 |
| | | | | 345/174 |
| 2013/0257767 A1* | 10/2013 | Wu | | G09G 5/18 |
| | | | | 345/173 |
| 2013/0278560 A1* | 10/2013 | Yamaguchi | | G06F 3/0445 |
| | | | | 345/174 |
| 2013/0307789 A1* | 11/2013 | Karamath | | G06F 3/016 |
| | | | | 345/173 |
| 2014/0002406 A1* | 1/2014 | Cormier, Jr. | | G06F 3/0446 |
| | | | | 345/174 |
| 2014/0002412 A1* | 1/2014 | Mo | | G06F 3/0446 |
| | | | | 345/174 |
| 2014/0125623 A1* | 5/2014 | Atkinson | | G06F 3/04166 |
| | | | | 345/174 |
| 2014/0160070 A1* | 6/2014 | Miyamoto | | G06F 3/04186 |
| | | | | 345/174 |
| 2014/0191769 A1* | 7/2014 | Coni | | G06F 3/04166 |
| | | | | 324/679 |
| 2014/0313163 A1* | 10/2014 | Coni | | G06F 3/04166 |
| | | | | 345/174 |
| 2014/0333581 A1* | 11/2014 | Cormier, Jr. | | G06F 1/3265 |
| | | | | 345/174 |
| 2015/0253933 A1* | 9/2015 | Lu | | G06F 3/0428 |
| | | | | 345/175 |
| 2015/0301651 A1* | 10/2015 | Leigh | | G06F 3/04166 |
| | | | | 345/174 |
| 2015/0301661 A1* | 10/2015 | Leigh | | G06F 3/046 |
| | | | | 345/174 |
| 2015/0331535 A1* | 11/2015 | Li | | G06F 3/0446 |
| | | | | 348/174 |
| 2016/0018867 A1* | 1/2016 | Nys | | G01R 27/2605 |
| | | | | 324/674 |
| 2016/0103527 A1* | 4/2016 | Coni | | G06F 21/35 |
| | | | | 345/174 |
| 2016/0342274 A1* | 11/2016 | Ye | | G06F 3/041662 |
| 2017/0102829 A1* | 4/2017 | Chikaoka | | G06F 3/04166 |
| 2017/0108965 A1* | 4/2017 | Kim | | G06F 3/04166 |
| 2017/0192597 A1* | 7/2017 | Kang | | G06F 1/3262 |
| 2017/0205947 A1* | 7/2017 | Wigdor | | G06F 3/03545 |
| 2017/0220185 A1* | 8/2017 | Kurasawa | | G06F 3/044 |
| 2017/0329456 A1* | 11/2017 | Leigh | | G06F 3/0412 |
| 2017/0344173 A1* | 11/2017 | Tang | | G06F 3/0447 |
| 2018/0032179 A1* | 2/2018 | Forlines | | G06F 3/0446 |
| 2018/0032202 A1* | 2/2018 | Kim | | G06F 3/041 |
| 2018/0059866 A1* | 3/2018 | Drake | | G06F 3/0446 |
| 2019/0079613 A1* | 3/2019 | Zhang | | H04M 1/0266 |
| 2019/0179446 A1* | 6/2019 | Kremin | | G06F 3/044 |
| 2020/0004400 A1* | 1/2020 | Muguruma | | G06F 3/04182 |
| 2020/0050303 A1* | 2/2020 | Wigdor | | G06F 3/0421 |
| 2020/0064969 A1* | 2/2020 | Gao | | G06F 3/0446 |
| 2020/0264727 A1* | 8/2020 | Lee | | G06F 3/0416 |

OTHER PUBLICATIONS

International Preliminary Report on Patentability dated Mar. 9, 2021, issued in corresponding International Application No. PCT/EP2019/074837, filed Sep. 17, 2019, 1 page.

International Search Report dated Nov. 4, 2019, issued in corresponding International Application No. PCT/EP2019/074837, filed Sep. 17, 2019, 3 pages.

Written Opinion of the International Searching Authority dated Nov. 4, 2019, issued in corresponding International Application No. PCT/EP2019/074837, filed Sep. 17, 2019, 8 pages.

* cited by examiner

MULTITOUCH TOUCH DEVICE EMPLOYING CAPACITIVE DETECTION

TECHNICAL FIELD

Implementations and embodiments of the disclosure relate to touch devices employing projected capacitive detection (known as PCAP). More particularly, the disclosure relates to the touch surfaces called "multitouch" that make it possible to detect a plurality of presses and their location.

These touch devices comprise a grid of sensors comprised of extremely fine conductive wires arranged in such a way as to form a matrix array and to detect the local variations in capacitance introduced by the proximity of the fingers of the user or of any other conductive object. Thus, when a finger touches the surface, an electrical capacitance is formed between the finger and the sensor grid making it possible to calculate the coordinates of the press.

A first alternative of the PCAP technology consists of detecting a mutual capacitance by reading each intersection between each row and each column of the matrix array. The variation in the capacitance during a press is about a FemtoFarad.

According to a second alternative of the projected capacitive detection technology, a self-capacitive detection is implemented which consists of an acquisition of presses by a reading of the rows then of the columns of the matrix array. During a press, the self-capacitance varies by about a Picofarad but when two simultaneous non-aligned presses occur, the matrix array indeed detects two real presses but also two phantom presses without the device being able to decide which ones are the real presses.

BACKGROUND

To resolve this problem, French patent application no. 2 976 692 proposes a measuring method based on the application of emission voltages at two different frequencies on the self-capacitance, which according to the frequency, have values representative of the presence of a press and of its position on the row or the column. However, this method only makes it possible to eliminate the phantom presses in the presence of two presses.

There is therefore a need to be able to detect the presence of more than two real presses while still eliminating the phantom presses created so as to best use the touch screen devices.

SUMMARY

The object of the disclosure is therefore a multitouch touch device employing capacitive detection comprising:
a touch matrix array and,
voltage-generating means configured to generate for each row and each column of the matrix array a first input voltage having a first frequency leading to the generation of a first output voltage.

This device includes means for generating, for each intersection between at least two rows and two columns of the matrix array, a second input voltage having a second frequency different from the first frequency leading to the generation of a second output voltage and processing means configured to determine, depending on first and second reference values, whether the first and second output voltages are representative of a press and of its position.

In other terms, the first input voltage is sent to each self-capacitance of each row and of each column, which after processing represents the first output voltage. Thus, if the first output voltage differs from the first reference value, a variation in capacitance is detected which means the presence of a real or phantom press.

To discriminate a real press from a phantom press, the second input voltage is sent to each mutual capacitance between at least two rows and two columns, which after processing represents the second output voltage. If the second output voltage differs from the second reference value, the press is real.

The first frequency is advantageously higher at the second frequency.

The first frequency is for example comprised between 1 MHz and 3 MHz. Ideally, it has a value around 2 MHz.

The second frequency, which represents the discrimination frequency, is for example comprised between 300 KHz and 500 KHz. Ideally, it has a value around 400 KHz.

Preferably, the processing means comprise a first synchronous demodulator configured to operate at the first frequency, receive the first output voltage so as to produce a first DC output voltage.

The synchronous demodulation makes it possible to extract the DC component from the signal that has the first output voltage and therefore makes it possible to obtain a signal that has a first DC output voltage. The DC output voltage is compared to the first reference value.

The synchronous demodulation moreover favours immunity to electromagnetic disturbances "EMI".

Advantageously, the processing means comprise a second synchronous demodulator configured to operate at the second frequency, the second demodulator being configured to receive the second periodic output voltage so as to produce a second DC output voltage.

Preferably, the first reference value corresponds to the first DC output voltage in the absence of a press, the second reference value corresponding to the second DC output voltage in the absence of a press.

The term "correspond" means that the first reference value is substantially equal to the first DC output voltage and that the second reference value is substantially equal to the second DC output voltage.

The first reference value is measured by the generating of the first input voltage on each row and each column in the absence of a press. For example, for a first input voltage of 14 V peak to peak and at 1 MHz, the first reference value after demodulation is 2.96V.

The second reference value is measured by the generating of the second input voltage at each intersection between each row and each column in the absence of a press. For example, for a second input voltage of 20 V peak to peak and at 400 KHz, the second reference value after demodulation is 0.45V.

Advantageously, the processing means comprise a memory module configured to memorize the first reference value and the second reference value.

After demodulation, the first and second reference values are stored for the purpose of comparing them with the first and second DC output voltages in order to determine if there is a real press and consequently locate it.

Advantageously, the first input voltage and the second input voltage are sinusoidal.

The sinusoidal shape makes it possible to prevent disturbances and adiation.

Preferentially, the first frequency and the second frequency are adjustable.

Preferably, the first reference value and the second reference value are constantly adjusted during the scanning of the matrix array.

According to another aspect, a method of capacitive detection for a multitouch touch device is proposed comprising a touch matrix array, wherein:
- for each row and each column of the matrix array a first input voltage is generated having a first frequency leading to the generation of a first output voltage, wherein:
- for each intersection between at least two rows and two columns of the matrix array a second input voltage is generated having a second frequency different from the first frequency and leading to the generation of a second output voltage, and
- it is determined, according to a first and a second reference value, whether the first and second output voltages are representative of a press and of its position.

Preferably, a first synchronous demodulation is carried out at the first frequency, of the first output voltage, so as to produce a first DC output voltage.

Preferentially, a second synchronous demodulation is carried out at the second frequency, of the second output voltage, so as to produce a second DC output voltage.

Preferably, the first reference value corresponds to the first DC output voltage in the absence of a press, the second reference value corresponding to the second DC output voltage in the absence of a press.

Preferentially, the first reference value and the second reference value are memorized.

Advantageously, the first input voltage and the second input voltage are sinusoidal.

Preferably, the first frequency and the second frequency are adjustable.

Preferentially, the first reference value and the second reference value are constantly adjusted during the scanning of the matrix array.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
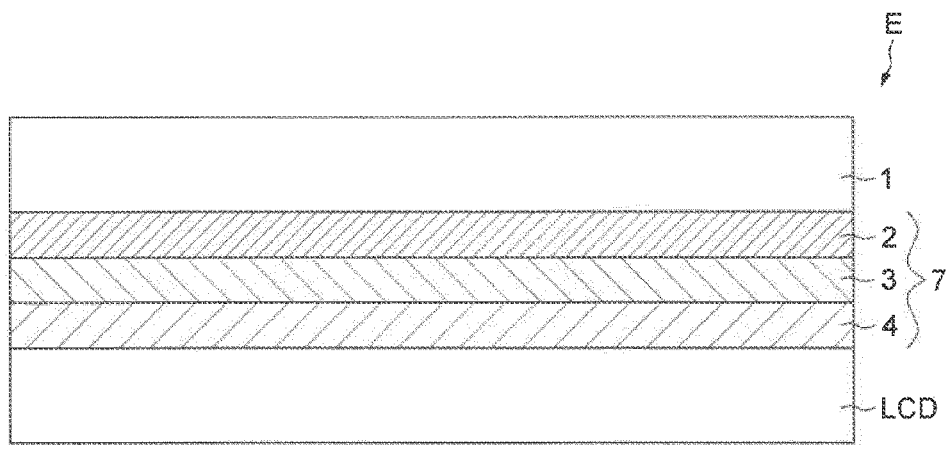
FIG. 1 shows a cross-section of a projected capacitive touch screen.

FIG. 1 shows a simplified and conventional model of a projected capacitive touch screen E.

The projected capacitive touch screen E is comprised of a glass plate 1 that makes it possible to project the touch screen.

The glass plate 1 rests on a first conductive plate 2 separated from a second conductive plate 4 by an adhesive and insulating layer 3.

The two conductive plates are advantageously made from indium tin oxide (ITO) having a resistivity of about: 2.10-4 $\Omega \cdot cm$.

The second conductive plate 4 rests on a display screen of the LCD (Liquid Cristal Display) type.

Figure 2:
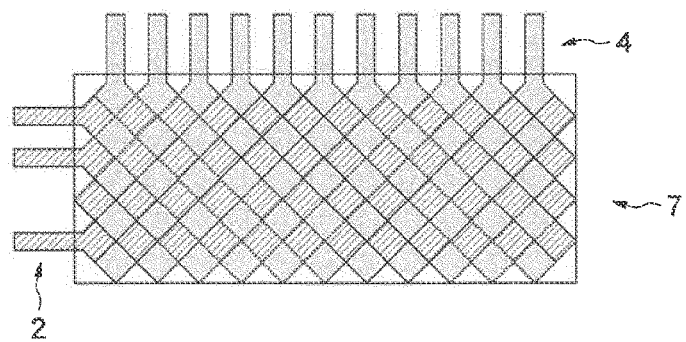
FIG. 2 shows a longitudinal cross-section of a sensor grid.

The first conductive plate 2 comprises a plurality of conductive fine wires disposed horizontally. The second conductive plate 4 also comprises a plurality of conductive fine wires disposed vertically. The two plates thus form a grid of fine wires in the form of a matrix array 7 as shown in FIG. 2 where the rows represent the conductive wires of the first conductive plate 2 and where the columns represent the conductive wires of the second conductive plate 4.

The matrix array is a detection matrix array arranged in such a way as to detect the local variations in capacitance introduced by the proximity of the fingers of the user or of any other conductive-designated object coupled to the coupled to the ground.

Figure 3:
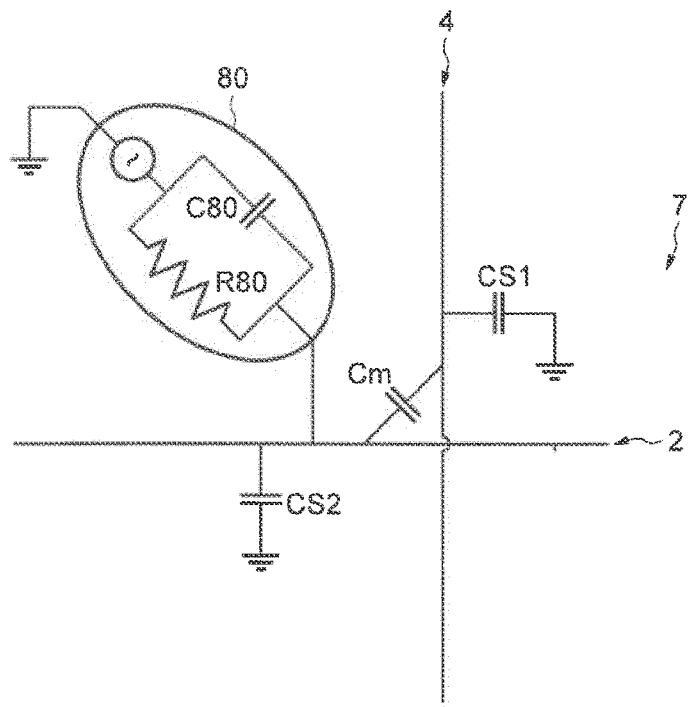
FIG. 3 shows an electrical diagram of the capacitances around a crossing between a row and a column of the grid.

FIG. 3 shows a detailed view of the electrical circuit between a row 2 and a column 4 of the matrix array leading to the local variations in capacitance during a press.

The conductive row 2 is coupled to a first self-capacitance CS2. During a press 80 represented symbolically by a circuit RC comprised of a resistor R80 and of a capacitor C80, the first self-capacitance CS2 varies by about a Picofarad.

The conductive column 4 is coupled to a second self-capacitance CS1. During a press, the second self-capacitance CS1 also varies by about a Picofarad.

The conductive row 2 and the conductive column 4 are connected by a mutual capacitance Cm. The variation in the capacitance Cm during the press 80 is about a FemtoFarad.

The conductive row 2 is connected to a resistor through which a current is injected, as shall be seen hereinafter.

The conductive column 4 is also connected to the resistor.

Thus, the rows 2 are constantly scanned by a first input voltage generated by the current injected into the resistor at a first frequency, for example 1 MHz and the columns 4 of the matrix array 7 are constantly scanned by a second input voltage at a second frequency, for example 400 kHz.

For example, in the absence of a press, the value of the capacitance CS1 is 100 pF for a first input voltage of 14 V peak to peak at 1 MHz. In the presence of a real or phantom press, the value of the capacitance CS1 varies by 10 pF.

To discriminate the real press from the phantom press, the capacitance Cm varies only if it is a real press. For example, in the absence of a press, the value of the capacitance Cm is 80 fF for a second input voltage of 20 V peak to peak and at 400 KHz. The latter varies by 20 fF if it is a real press.

Figure 4:
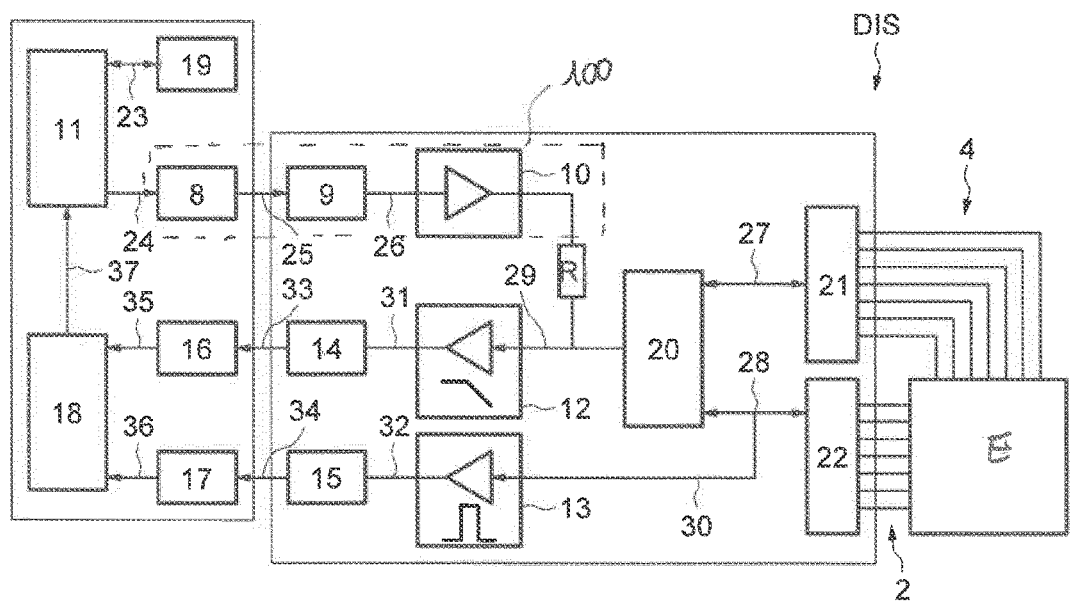
FIG. 4 shows the synoptic of a projected capacitive touch device according to the disclosure.

FIG. 4 shows a diagram of a touch device employing capacitive detection DIS according to the disclosure.

The device DIS comprises the touch matrix array 7 comprising as shown in FIG. 3 the conductive rows 2 and the conductive columns 4 parallel with each other and voltage-generating means 100 comprising a variable-frequency digital voltage generator 8, a digital-to-analogue converter 9 (DAC) and an amplifier 10. The generator 8 supplies the touch matrix array 7 with AC voltages through the digital-to-analogue converter 9, the amplifier 10 and a resistor R.

The voltage-generating means 100 are configured to generate for each row 2 and each column 4 of the matrix array 7 the first input voltage having the first frequency, and to generate for each intersection between at least two rows and two columns the second input voltage having the second frequency.

The device DIS further comprises processing means 11 configured to determine, depending on first and second reference values, whether the first and second output voltages are representative of a press and of its position.

It moreover comprises an electronic processing chain comprising a first acquisition chain 12 and a second acquisition chain 13, a first analogue-to-digital converter (ADC) 14, a second analogue-to-digital converter 15, a first synchronous demodulator 16 and a second synchronous demodulator 17.

The first and the second synchronous demodulators 16 and 17 are connected to filtering means 18.

The device DIS moreover comprises receiving-transmitting means 19 (UART for "Universal Asynchronous Receiver Transmitter") configured to transmit the signals processed by the processing means 11 to another device for example an LCD screen. They are also configured to transmit information/commands to the processing means 11.

Finally, a network of multiplexors 20, 21 and 22 is configured to apply the first input voltage then the second input voltage to the touch matrix array 7 and route the first output voltage and the second output voltage to the electronic processing chain.

The operation of the device DIS is as follows.

The receiving-transmitting means 19 first transmit to the processing means 11 the signal 23 to be processed.

After processing by the processing means 11, a control signal 24 is sent to the voltage-generating means 100 and more precisely to the digital voltage generator 8 to generate the first input signal 25.

The digital-to-analogue converter 9 then converts the signal 25 into a sinusoidal AC signal 26 having the first frequency. The signal 26 is then amplified by the amplifier 10.

The resulting signal is thereafter sent to the multiplexor 20 which sends the first input signal 27 to the multiplexor 21 then the second input signal 28 to the multiplexor 22.

The first input signal then supplies the network of conductive rows 2 and the second input signal supplies the network of conductive columns 4.

Thereafter, the multiplexor 21 retrieves the first output signal and transmits it to the multiplexor 20, and the multiplexor 22 retrieves the second output signal and transmits it to the multiplexor 20.

The first output signal represented by the signal 29 is sent to the first acquisition chain 12.

Then, the second output signal also represented by the signal 30 is sent to the first acquisition chain 12.

The first acquisition chain 12 produces the signal 31 that is sent to the first analogue-to-digital converter 14.

The first analogue-to-digital converter 14 produces the digital signal 33 representative of the first digital output signal.

The first output signal 33 is then demodulated by the first synchronous demodulator 16 working at the first frequency.

The first synchronous demodulator then produces the signal 35.

The signal 35 is then sent to the filtering means 18 which produce as output the signal 37 which is thereafter sent to the processing means 11 and to the receiving-transmitting means 19.

Thereafter, a new control signal 24 is sent to the voltage-generating means 100 and more precisely to the digital voltage generator 8 to generate the first input signal 25.

The digital-to-analogue converter 9 then converts the signal 25 into a sinusoidal AC signal 26 having the second frequency. The signal 26 is then amplified by the amplifier 10.

The resulting signal is thereafter sent to the multiplexor 20 which sends the input signal 27 to the multiplexor 21.

The input signal 27 then supplies the intersections between the conductive rows 2 and the conductive columns 4.

Advantageously, only the intersections where a press has been detected are supplied.

Thereafter, the multiplexor 22 retrieves the output signal.

The output signal represented by the signal 30 is sent to the second acquisition chain 13.

The second acquisition chain 13 produces the signal 32 that is sent to the second analogue-to-digital converter 15.

The second analogue-to-digital converter 15 produces the digital signal 34 representative of the digital output signal.

The output signal 34 is then demodulated by the second synchronous demodulator 17 working at the second frequency.

The second synchronous demodulator then produces the signal 36.

The signal 36 is then sent to the filtering means 18 which produce as output the signal 37 which is thereafter sent to the processing means 11 to discriminate the real presses from the phantom presses.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A multitouch touch device (DIS) employing capacitive detection comprising:
   a touch matrix array;
   a first voltage generator configured to generate for each row and each column of said matrix array, a first input voltage having a first frequency leading to the generation of a first output voltage, a second voltage generator configured to generate, for each intersection between at least two rows and two columns of said matrix array a second input voltage having a second frequency different from said first frequency leading to the generation of a second output voltage; and
   a processing circuit configured to determine, depending on first and second reference values, whether said first and second output voltages are representative of a press and of its position.

2. The multitouch touch device (DIS) according to claim 1, wherein said processing circuit comprises a first synchronous demodulator configured to operate at said first frequency, receive said first output voltage so as to produce a first DC output voltage.

3. The multitouch touch device (DIS) according to claim 2, wherein said processing circuit comprises a second synchronous demodulator configured to operate at said second frequency, said second demodulator being configured to receive said second output voltage so as to produce a second DC output voltage.

4. The multitouch touch device (DIS) according to claim 3, wherein said first reference value corresponds to said first DC output voltage in the absence of a press, and wherein said second reference value corresponds to said second DC output voltage in the absence of a press.

5. The multitouch touch device (DIS) claim 1, wherein the processing circuit comprises a memory module configured to memorize said first reference value and said second reference value.

6. The multitouch touch device (DIS) according to claim 1, wherein said first input voltage and the second input voltage are sinusoidal.

7. The multitouch touch device (DIS) according to claim 1, wherein the first frequency and the second frequency are adjustable.

8. The device according to claim 1, wherein said first reference value and said second reference value are constantly adjusted during the scanning of the matrix array.

9. A method of capacitive detection for a multitouch touch device (DIS) comprising a touch matrix array, wherein:
for each row and each column of said matrix array, generating a first input voltage having a first frequency leading to the generation of a first output voltage,
for each intersection between at least two rows and two columns of said matrix array, generating a second input voltage having a second frequency different from said first frequency and leading to the generation of a second output voltage, and
determining, according to a first and a second reference value, whether said first and second output voltages are representative of a press and of its position.

10. The method according to claim 9, wherein a first synchronous demodulation is carried out at said first frequency, of the first output voltage, so as to produce a first DC output voltage.

11. The method according to claim 10, wherein a second synchronous demodulation is carried out at said second frequency, of the second output voltage, so as to produce a second DC output voltage.

12. The method according to claim 11, wherein said first reference value corresponds to said first DC output voltage in the absence of a press, and wherein said second reference value corresponds to said second DC output voltage in the absence of a press.

13. The method according to claim 9, further comprising storing said first reference value and said second reference value.

14. The method according to claim 9, wherein said first input voltage and the second input voltage are sinusoidal.

15. The method according to claim 9, further comprising adjusting the first frequency and the second frequency.

16. The method according to claim 9, further comprising constantly adjusting said first reference value and said second reference value during the scanning of the matrix array.

17. The method according to claim 9, wherein the first frequency and the second frequency are adjustable.

* * * * *